United States Patent [19]

Bennett et al.

[11] 4,036,554
[45] July 19, 1977

[54] LASER MODULATOR FOR PRODUCING DARK-PULSES

[75] Inventors: Robert James Bennett, Carmel; Daniel Richard Grischkowsky, Peekskill, both of N.Y.

[73] Assignee: International Business Machines Corporation, Armonk, N.Y.

[21] Appl. No.: 727,747

[22] Filed: Sept. 29, 1976

[51] Int. Cl.² .............................................. H01S 3/00
[52] U.S. Cl. ............................... 350/160 R; 307/88.3; 332/7.51
[58] Field of Search .................. 350/160 R; 332/7.51; 307/88.3

[56] References Cited
U.S. PATENT DOCUMENTS 3,909,749  9/1975  Weber ................................. 332/7.51

*Primary Examiner*—Rudolph V. Rolinec
*Assistant Examiner*—Darwin R. Hostetter
*Attorney, Agent, or Firm*—John J. Goodwin

[57] ABSTRACT

A dark pulse is manifested when the intensity of a laser beam, for example, a continuous wave laser beam drops to zero and returns to its original intensity in a very short time period. A modulator for producing dark pulse outputs is disclosed which includes a two-photon absorption cell provided with two input laser beams: a continuous wave beam having a frequency $\omega_1$ and a mode-locked laser beam having a frequency $\omega_2$ selected such that $\omega_1 + \omega_2 = \Omega_{12}$ where $\Omega_{12}$ is also the two-photon absorption frequency of the vapor contained in the cell. The mode locked beam modulates the continuous wave beam to produce the desired dark pulses.

10 Claims, 3 Drawing Figures

LASER MODULATOR FOR PRODUCING DARK-PULSES

The invention was made under a Government Contract with Department of the Navy under Contract No. N00014-76-C-0907.

BACKGROUND OF THE INVENTION

1. Field of the Invention

The present invention relates to laser modulators and more particularly to an absorption cell for modulating two input laser beams to produce an output beam including dark pulses.

2. Description of the Prior Art

There exist many devices in the prior art which accept two or more input laser beams and perform frequency conversion or difference-frequency mixing functions.

An example of a prior art device of this nature is described in U.S. Pat. No. 3,914,618 issued Oct. 21, 1975 on an application filed Jan. 28, 1974 by S. E. Harris and entitled TWO-PHOTON PUMPED FREQUENCY CONVERTER AND METHOD. This patent describes a frequency converter having a cell containing a metal vapor which is pumped by a first laser beam at a frequency $\omega_p$ such that two of its photons equals the spacing of a two-photon transition of the metal vapor to symmetrically excite the metal atoms. The cell is also simultaneously responsive to an incident radiation beam at frequency $\omega_t$ which may be another laser beam. The second radiation beam couples the two-photon excited state to an allowed transition to ground. This produces or generates side bands at twice the pump frequency $2\omega_p$, plus or minus the frequency of the second beam $\omega_t$, for an output frequency $2\omega_p \pm \omega_t$.

Another typical example of producing a difference frequency by using two laser beams is described in U.S. Pat. No. 3,869,618 issued Mar. 4, 1975 and an application filed Oct. 30, 1972 by Lax et al entitled HIGH-POWER TUNABLE FAR INFRARED AND SUB-MILLIMETER SOURCE and assigned to Massachusetts Institute of Technology. This patent described the use of two high-intensity laser beams, both in the near-infrared region or visible region to produce a tunable output signal. The frequency of the output beam is the same as the difference in frequency between the two input beams. The two beams are directed upon a non-linear crystal which serves to mix the input radiation and thereby generate a difference-frequency radiation that is emitted from the crystal as an output.

Neither of the aforesaid references, or other known prior art anticipate, suggest or relate to the present invention wherein mode-locked laser pulses are used to modulate a continuous wave laser beam within a two-photon absorption cell to produce dark pulses. The device of the present invention functions as a shutter for the continuous wave beam rather than a mixing or frequency conversion device, with the result being the production of dark pulses as output from the cell.

SUMMARY OF THE INVENTION

An object of the present invention is to provide a dark pulse generating device wherein a laser output beam is produced hving an intensity which periodically goes to zero and returns to its original intensity to produce a dark pulse.

Another object of the present invention is to provide a dark pulse generating device wherein a laser beam is modulated by a mode-locked laser beam to produce dark pulses synchronized with the pulses of the mode-locked beam.

A further object of the present invention is to provide a dark pulse generating device wherein a laser beam is modulated by controlling the absorption in a two-photon cell by a mode-locked laser beam to produce a dark pulse output beam.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
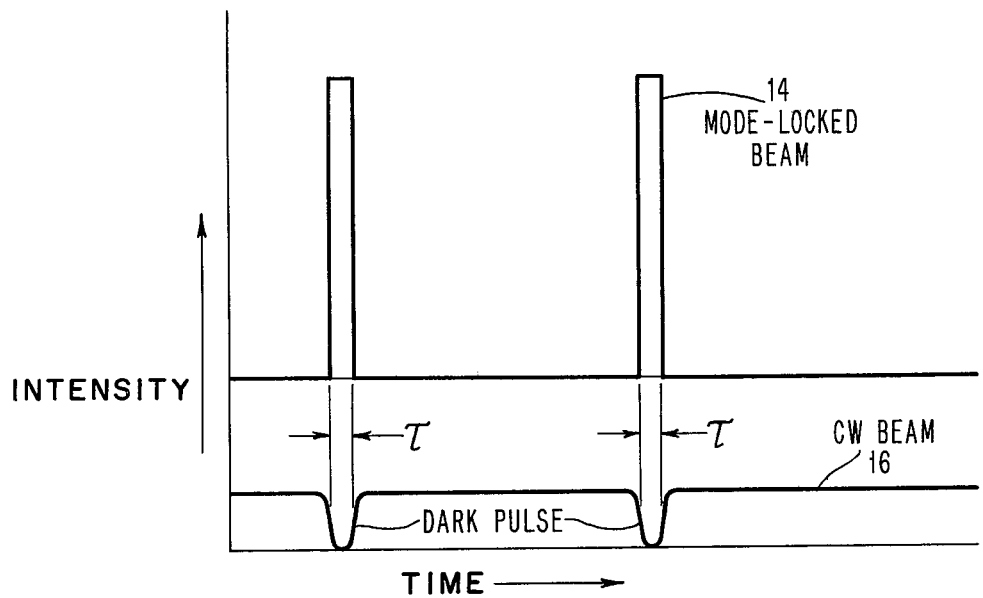
FIG. 1 is an illustration of the mode-locked beam waveform and the continuous wave beam waveform after modulation by the mode-locked pulses to produce the dark pulses.
Figure 2:
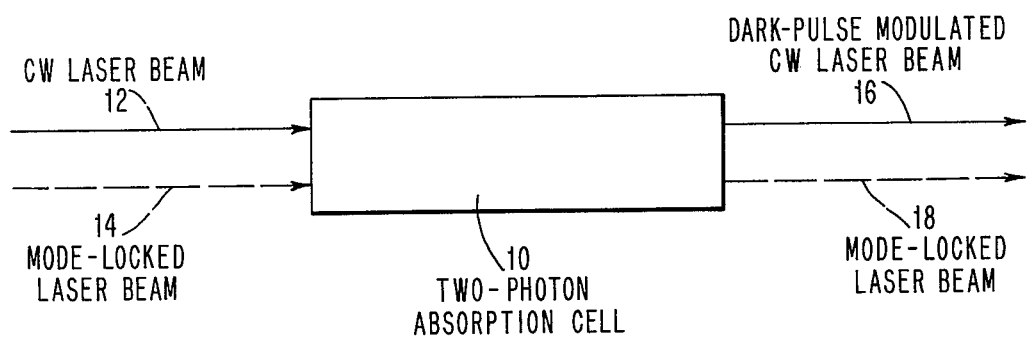
FIG. 2 is a schematic block diagram of a dark pulse modulation device according to the principles of the present invention.

It is known that dark pulses are useful in signal processing applications because they can propagate without distortion in optical waveguides. A dark pulse with pulsewidth $\tau$ is produced when the intensity of a laser beam such as a continuous wave beam goes to zero and then back to its original value in a time $\tau$. FIG. 1 illustrates dark pulses of pulsewidth $\tau$ of cw beam 16.

Thus, it is desirable to provide a simple, reliable device for producing dark pulses. The present invention is directed to such a dark pulse producing means when a laser beam such as a continuous wave beam is modulated by a mode-locked laser beam in a two-photon absorption cell which operates as an optical shutter. Referring to FIG. 1, a two-photon absorption cell 10 is illustrated and is shown responsive to two input laser beams: a continuous wave (c.w.) beam and a mode-locked beam 14.

The c.w. laser beam 12 has a frequency $\omega_1$ and the mode-locked laser beam 14 has a frequency $\omega_2$. Frequencies $\omega_1$ and $\omega_2$ are chosen so that $\omega_1 + \omega_2 = \Omega_{12}$. Beams 12 and 14 are simultaneously passed through an absorption cell 10 which exhibits a strong two-photon absorption at frequency $\Omega_{12}$. The two-photon absorption of the c.w. beam is determined by the intensity of the powerful mode-locked beam. As will be shown, the absorption is strong enough to completely extinguish the c.w. beam, and is only present while the mode-locked laser pulses illustrated in FIG. 1 are traversing the absorption cell 10. Consequently, the pulse-width $\tau$ of the dark pulses produced as a result of the c.w. beam being extinguished is approximately the same as the pulsewidth of the mode-locked laser pulses, and this pulsewidth can be in the picosecond range. Thus, after passage through absorption cell 10 the c.w. beam has become dark-pulse modulated with a replica of the mode-locked pulse train and emerges from cell 10 as modulated beam 16.

Figure 3:
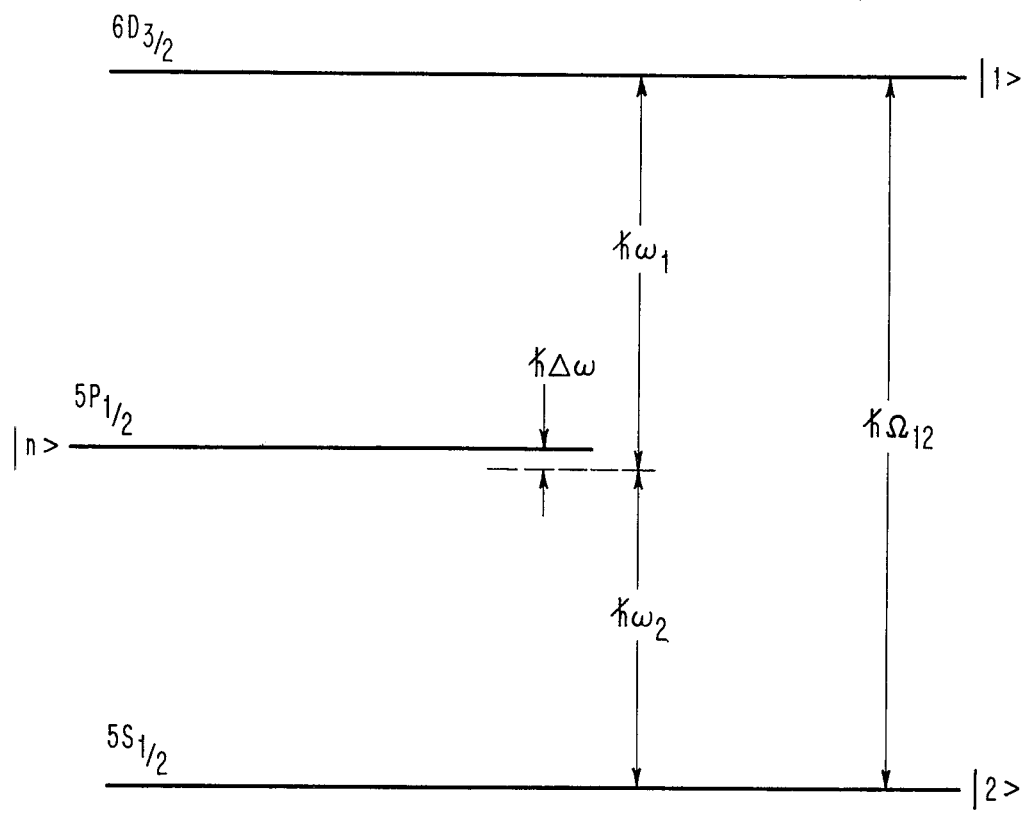
FIG. 3 is an illustration helpful in describing the operation of the device of FIG. 2.

For proper operation, cell 10 must provide sufficient absorption of the c.w. beam. In one embodiment cell 10 may be rubidium (Rb) metal vapor cell. FIG. 3 illustrates the conditions for Rb vapor as the two-photon absorber, and the two-photon absorption coefficient on line center for the c.w. laser beam is given by the expression $$\alpha = \frac{8\pi^3 N P_{n2}^2 P_{n1}^2 E_2^2 (\ln 2/\pi)^{\frac{1}{2}}}{\lambda_1 \hbar^3 (\Delta\omega)^2 \Delta\omega_D}$$

where N is the atomic number density; $\lambda_1$ is the wavelength of the c.w. laser light of frequency $\omega_1$; $\Delta\omega_D$ is the Dopple width (FWHM) of the two-photon transition; $\Delta\omega$ is the angular frequency offset to the intermediate state as shown in FIG. 3; $P_{n1}$ is the matrix element of the electric dipole moment between states $|1>$ and $|n>$; $P_{n2}$ is the matrix element of the electric dipole moment between states $|2>$ and $|n>$; $E_2$ is the electric field of the mode-locked laser beam with frequency $\omega_2$.

For reasonable values $N = 10^{13}$ atoms/cm$^3$, $E_2$ corresponding to an intensity of 100 Kw/cm$^2$ and $\Delta\omega/2\pi c = 5$ cm$^{-1}$, the absorption coefficient is equal to $\alpha = 6.7 \times 10^{-2}$cm$^{-1}$. Thus, for a cell of 60 cm, and using a pulsed dye laser and a tunable c.w. laser to produce beams 14 and 12, the c.w. beam would be attenuated by exp (−4) at the peak of the mode-locked laser pulses, and good dark pulses would be formed.

It should be understood that the specific embodiment described above was one typical example and that other embodiments can be provided within the scope of the present invention. Thus absorption cell 10 may include metal vapors such as sodium, potassium, cesium, calcium, strontium, barium, or combinations thereof also in combination with an inert gas.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A laser modulator for generating a laser output beam containing dark pulses comprising:
   a two-photon absorption cell containing a metal vapor,
   a first laser beam introduced as a first input to said absorption cell,
   and a second, mode-locked laser beam including mode-locked pulses introduced as a second input to said absorption cell, said mode-locked pulses of said second laser beam causing a two-photon absorption to completely extinguish said first laser beam during the period of said mode-locked pulses to produce an output laser beam from said absorption cell having dark pulses occurring in synchronism with said mode locked pulses.

2. A laser modulator according to claim 1 wherein said first laser beam is a high intensity continuous wave beam.

3. A laser modulator according to claim 2 wherein said first laser beam has a frequency $\omega_1$, said second laser beam has a frequency $\omega_2$ and said two photon absorption cell exhibits a strong two-photon absorption at a frequency $\Omega_{12} = \omega_1 + \omega_2$.

4. A laser modulator according to claim 3 wherein said two-photon absorption cell contains rubidium vapor.

5. A laser modulator according to claim 3 wherein said two-photon absorption cell contains sodium vapor.

6. A laser modulator according to claim 3 wherein said two-photon absorption cell contains potassium vapor.

7. A laser modulator according to claim 3 wherein said two-photon absorption cell contains cesium vapor.

8. A laser modulator according to claim 3 wherein said two-photon absorption cell contains calcium vapor.

9. A laser modulator according to claim 3 wherein said two-photon absorption cell contains strontium vapor.

10. A laser modulator according to claim 3 wherein said two-photon absorption cell contains barium vapor.

* * * * *